United States Patent
von Spreckelsen et al.

(10) Patent No.: US 7,578,040 B2
(45) Date of Patent: Aug. 25, 2009

(54) CONTAINER CLOSURES

(75) Inventors: Henning von Spreckelsen, Woking (GB); Peter Michael McGeough, Navan (IE)

(73) Assignee: Bapco Closures Research Limited, England (GB)

( * ) Notice: Subject to any disclaimer, the term of this patent is extended or adjusted under 35 U.S.C. 154(b) by 156 days.

(21) Appl. No.: 10/898,459

(22) Filed: Jul. 23, 2004

(65) Prior Publication Data

US 2005/0072816 A1     Apr. 7, 2005

Related U.S. Application Data

(63) Continuation of application No. PCT/GB03/00190, filed on Jan. 16, 2003.

(30) Foreign Application Priority Data

Jan. 25, 2002  (GB) ................. 0201718.4
Dec. 3, 2002   (GB) ................. 0228182.2

(51) Int. Cl.
    *B23P 21/00*    (2006.01)
(52) U.S. Cl. .................... 29/469; 215/232
(58) Field of Classification Search .......... 29/469; 215/232; 222/153.05–153.07, 541.2
    See application file for complete search history.

(56) References Cited

U.S. PATENT DOCUMENTS

| 3,504,817 A | * | 4/1970 | Heider ............... 215/232 |
| 4,059,201 A | * | 11/1977 | Foster ............... 220/258.2 |
| 4,359,169 A | * | 11/1982 | Helms et al. ............ 220/255.1 |
| 4,457,455 A | * | 7/1984 | Meshberg ............... 222/105 |
| 4,815,618 A | | 3/1989 | Gach |
| 6,364,180 B1 | * | 4/2002 | Cardenas ............... 222/541.2 |
| 6,877,630 B2 | * | 4/2005 | von Spreckelsen et al. ............ 220/258.1 |

FOREIGN PATENT DOCUMENTS

| EP | 0801007 A1 | 10/1997 |
| GB | 2108464 A | 5/1983 |
| GB | 2337740 A | 12/1999 |
| GB | 2350105 A | * 11/2000 |
| JP | 01-015087 | 8/1990 |
| WO | 99/61336 A1 | 12/1999 |
| WO | WO-99/61337 A2 | 12/1999 |
| WO | WO-99/61337 A3 | 12/1999 |
| WO | WO-01/12531 A1 | 2/2001 |
| WO | WO-01/13407 A2 | 2/2001 |

* cited by examiner

*Primary Examiner*—David P Bryant
*Assistant Examiner*—Christopher M Koehler
(74) *Attorney, Agent, or Firm*—Holland & Hart LLP

(57) ABSTRACT

A closure for a container comprises a spout (22) containing a plastics coated foil (40) that is welded via one face to an inside flange (30) of the spout (22) and by means of a depending portion (42) on its opposite face to a side wall (10) of the container so that forces on the weld between foil portion (42) and the container when the closure is opened are in sheer rather than in tension. The closure can be used with a PET bottle or with other types of plastics or plastics coated containers.

10 Claims, 6 Drawing Sheets

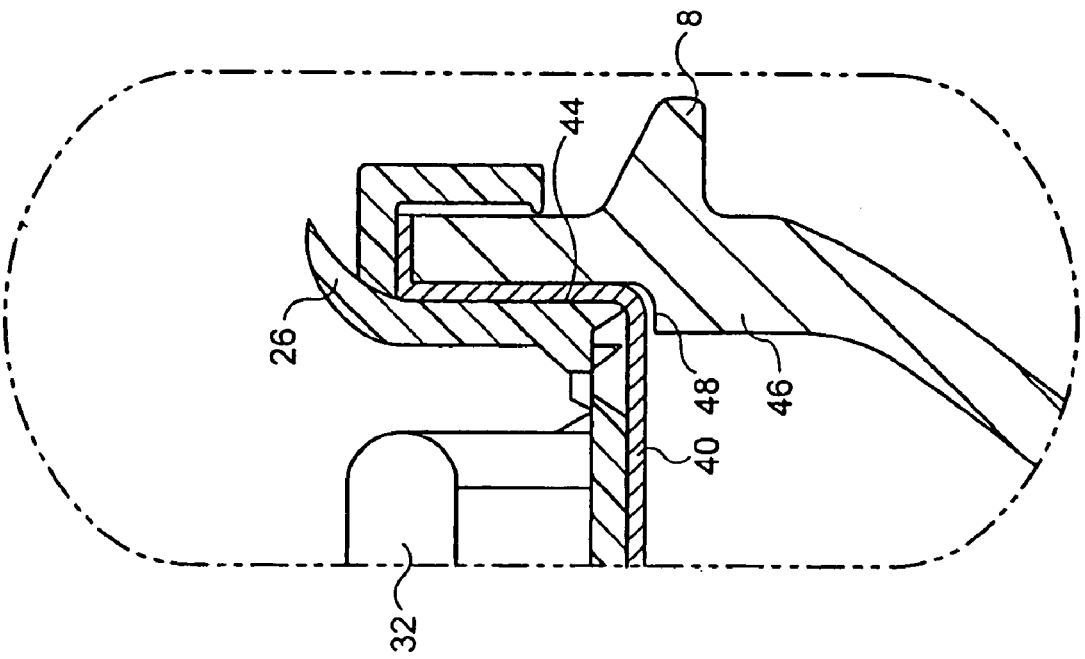
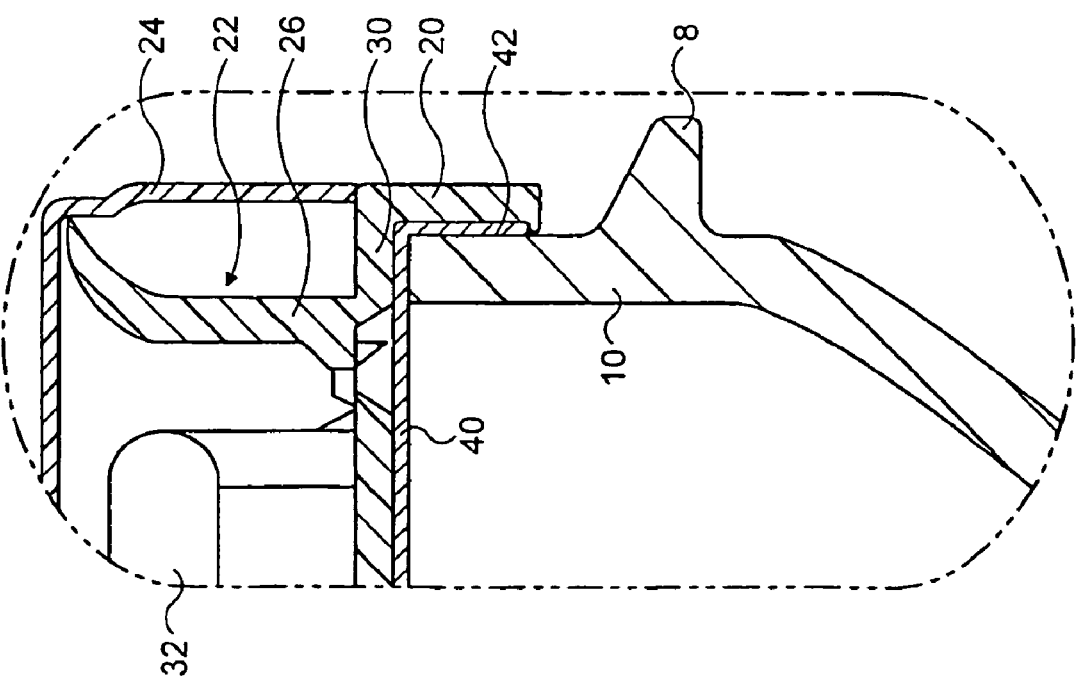
FIG. 2
FIG. 3

CONTAINER CLOSURES

CROSS REFERENCE TO RELATED APPLICATIONS

This non-provisional patent application claims the priority benefit of international PCT application number PCT/GB03/00190, entitled "CONTAINER CLOSURES", filed by Spreckelsen McGeough Limited on international filing date 16Jan 2003, which application is incorporated by reference into this application in its entirety, and which claims priority benefit of United Kingdom patent application number 0201718.4, filed 25Jan 2002, and United Kingdom patent application number 0228182.2, filed 3Dec. 2002.

BACKGROUND OF THE INVENTION

The present invention relates to closure technology for plastics or plastics coated containers. It is applicable to plastics bottles and steel containers which have a plastics coating or containers made of composite materials with a sandwich construction having plastics surfaces with paper and EVOH or aluminium layers glued together between the plastics surfaces.

The invention is particularly applicable to carbonated and non-carbonated, pasteurised, aseptic or hot-fill products and more specifically to a process for assembling a plastics spout to such a container. The predominant plastics material for gas-tight and heat-resist plastics bottles suitable for this purpose is PET (polyethylene terephthalate).

PET bottles cannot be used for sterilisation by retorting or autoclaving as is used for cans, glass bottles and some high heat resistant plastics such as polypropylene, as they cannot withstand the long exposure to temperatures of the order of 120° C. that are involved.

However sterile packaging in such plastics bottles can be achieved by an aseptic process or by hot filling.

In aseptic filling a UHT process is used to process the product prior to filling. The product is subjected to high temperature (140° C.) for a very short period (4 seconds) and then cooled to a temperature between ambient and 4 degrees C. Once cooled the product must remain in sterile conditions and cannot be exposed to environmental air or bacteria. The bottles and caps must also be cleaned and sterilised, typically using Hydrogen Peroxide or Paracetic acid, which is evaporated off the components. The bottles are then filled and sealed in an aseptic environment. The packaging must also be sealed tightly enough to prevent re-infection. While this process is effective to provide long shelf-life products and can be used with PET bottles the cost of the filling plant is significant.

PET bottles are also used in hot filling processes in which the product is at a temperature of typically in excess of 85° C. as it enters the bottle. In this process the bottles must be clean but not necessarily sterile as any bacteria present will be killed by the hot product. Hot fill processes are more economic but their applications are restricted by the limited heat resistance of PET, which suffers distortion at temperatures over 75° C. Greater than normal heat resistance can be obtained by crystallizing a neck of the bottle, but this increases the cost of the packaging.

A further technical problem is encountered when PET bottles are used in hot filling because a partial vacuum is created inside the bottle after it has been sealed as the product cools. This makes it necessary to develop constructions that prevent collapsing of the container. Examples of such structures are described in WO0113407 and WO0112531 in the name of Graham Packaging Company L P.

An injection stretch blow-moulded PET bottle will normally be sealed by means of an injection moulded cap which engages with features injection moulded on a neck of a preform prior to stretch blow-moulding into a bottle. This will result in good sealing characteristics if the neck remains as originally moulded but begins to fail if there is distortion during the hot filling process. Since a tight seal is essential to prevent re-infection this limits the scope for using PET bottles in the more economical hot filling process although this problem can be overcome by the use of a neck containing more material or by crystallization. These solutions increase the cost of the packaging. The present invention aims to solve this technical problem by the use of alternative closure technology.

An injection moulded spout with a cap has been described in WO 99/61337 (Spreckelsen McGeough Ltd). This type of closure technology has been applied to extrusion blow moulded bottles where the bottle body and the spout and cap could be made of the same material, typically high density polyethylene (HDPE). Such a material has a typical melting point of 140° C. In this closure technology the bottle and spout are sealed together by means of an intervening plastics coated foil which is welded to both surfaces. The spout and cap assembly is applied to a bottle body after filling and would therefore not be affected by the passage of the hot filled product during hot filling. Technical problems are encountered if such a closure assembly is applied to a PET bottle.

The first technical problem relates to the distortion of a pourer part of the spout when it is subjected to temperatures sufficient to weld the foil to PET, which only melts at 220° C. although some distortion will occur at lower temperatures. It is not practicable to make the spout from PET as this material is too brittle for injection moulding a component of this type.

A second technical problem of low weld strength arises if lower temperatures are used to produce the weld between the plastics coated foil and the PET bottle. This may result in a weld which is not strong enough to hold in the pressure of a carbonated product. If the weld joining the spout to the bottle body is weak it may be possible to remove the spout at this junction by applying a lever under a skirt of the spout and using a transport ring of the bottle as a pivot support. This undermines the use of the foil to provide tamper evidence.

Prior art proposals such as described in GB-A-2108464 (Container Corporation of America) suggest welding a foil onto an upper flat top surface of a container.

Unfortunately, this proposal would create a third technical problem if used with PET containers because of the weakness of the weld strength as described above.

SUMMARY OF THE INVENTION

The present invention provides a process for assembling a plastics spout to a neck portion defined by a side wall substantially perpendicular to a plane of aligned openings in the neck portion and spout, the side wall being made of or coated with a first plastics material, wherein the spout contains a foil that closes the opening in the spout, the foil having an exposed face coated with a second plastics material compatible with the first plastics material, the process comprising the steps of placing the spout on the neck portion and welding a portion of the exposed face of the foil to the first plastics material of the side wall.

By welding to a side wall which, in the case of a standard cylindrical neck portion in normal orientation would be vertical, the weld is subjected to a sheer force when a ring pull secured to the foil is used to tear the foil using a force directed along the vertical axis of the neck portion. This contrasts to the tension force which is produced between a weld between the foil and a top horizontal face of the neck portion as suggested by Container Corporation and used in the construction of earlier closures for extruded blow moulded bottles. The process of the present invention does not preclude the creation of a weld between the exposed face of the foil and such a horizontal face of the neck portion above the side wall.

The presence of the vertical weld is also important if any attempt is made to lever off the spout as this also creates a sheer force on this vertical weld. Therefore, this closure technology provides additional security as any removal of the spout would, if successful, result in evident damage to the spout and neck portion.

The solution to the present invention is particularly advantageous when the first plastics material is PET as there is a significantly improved relative strength of a PET weld in sheer rather than in tension.

Preferably the neck portion is an integral part of a container. However in the case of cans, the neck portion may be formed as part of a can end. The can end with spout attached is sealed to the can after the can has been filled.

Typically PET containers are manufactured from injection moulded preforms which are subsequently stretch blow moulded to the required shape. Because the PET bottles are typically used with screw caps, a neck of the preform is moulded with integral screw threads to engage with the cap. The presence of these formations on the neck requires a more complex mould and a significant amount of material. A considerable portion of the cost and weight of a PET bottle is represented by the need to create a complex neck structure to engage with the screw cap.

It will be appreciated that the foil sealed spout as described in WO 99/61337 referred to above does not require the use of any specific formation on a neck of the bottle body itself and therefore the use of this type of closure instead of the conventional screw cap has the advantage that a much simpler preform having a completely smooth neck can be used. This would eliminate the need for side splits in an upper part of an injection mould as would be required for moulding screw threads. Less material can also be employed. A smooth neck is also easier to keep sterile and to clean. Simpler preforms can also be produced more reliably.

Although it has been proposed to wrap a conduction foil, which is plastics coated on a lower side only, round a side wall of a bottle, it has hitherto always been the case that welds have been made between the foil and a horizontal upper surface of the bottle neck that is easily accessible to a heated iron. Conduction foil capsules have also been provided with side walls to give the foil some structural stability during the assembly process before they are placed on a bottle. A secondary over-cap is then often used to overlie the conduction foil. This type of closure technology does not provide a good resealing capability once the foil has been removed whereas the closure technology of WO 99/61337 (Spreckelsen McGeough Ltd) provides an excellent resealing capability. It is also not practicable to use double sided conduction foils to seal to both containers and spout as a heated iron cannot be applied to a plastics coated foil surface.

Preferably the spout provides a supporting structure to hold the portion of the exposed face of the foil needed to weld to the side wall in the appropriate position and this makes it easier to seal containers using this closure technology as the spout and cap assembly can be perched onto the neck portion prior to the formation of the side weld.

The present invention also provides a container having a side wall made of or coated with a first plastics material, a foil welded to an inner or outer surface of the side wall by means of a coating of plastics material compatible with the first plastics material, the foil extending across an opening defined by the neck and being sealed to a closure for the container.

BRIEF DESCRIPTION OF THE DRAWINGS

In order that the invention may be well understood an embodiment thereof will now be described, by way of example only, with reference to the accompanying diagrammatic drawings, in which:

FIG. 2 shows a detail from a cross section of a neck and cap assembly secured to a bottle neck made from the preform of FIGS. 1A and 1B;

FIG. 3 shows a detail similar to FIG. 2 with the cap removed showing an alternative configuration for the weld position on an inner face of a side wall of the bottle neck;

DETAILED DESCRIPTION OF A PREFERRED EMBODIMENT

Figure 5:
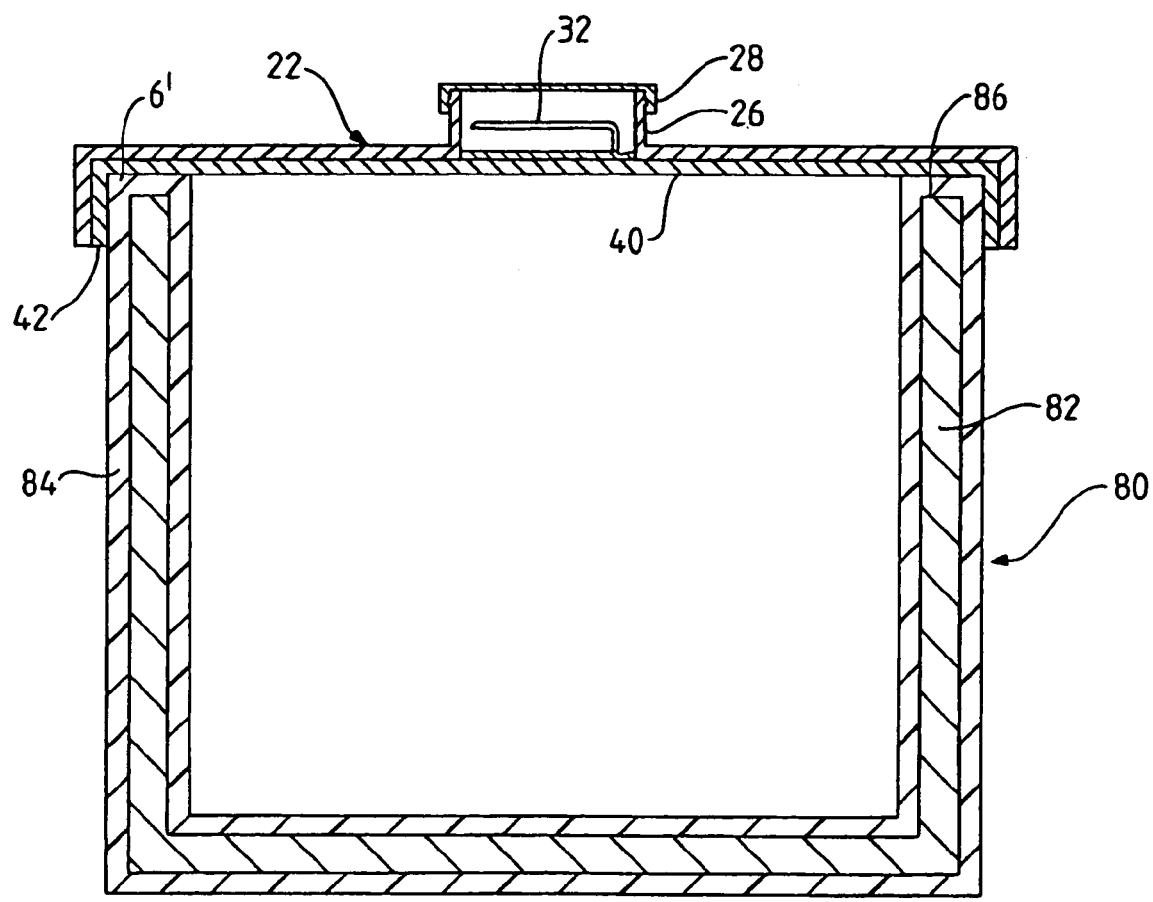
FIG. 5 shows a section through a spout fitted to a composite container.
Figure 6:
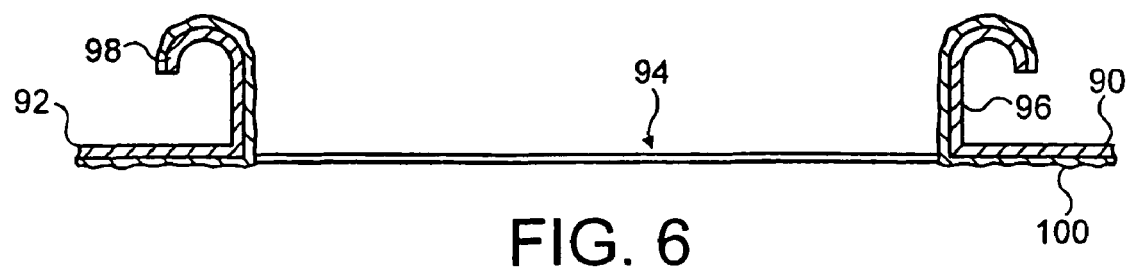
FIG. 6 shows a section through an end plate for a can.
Figure 7:
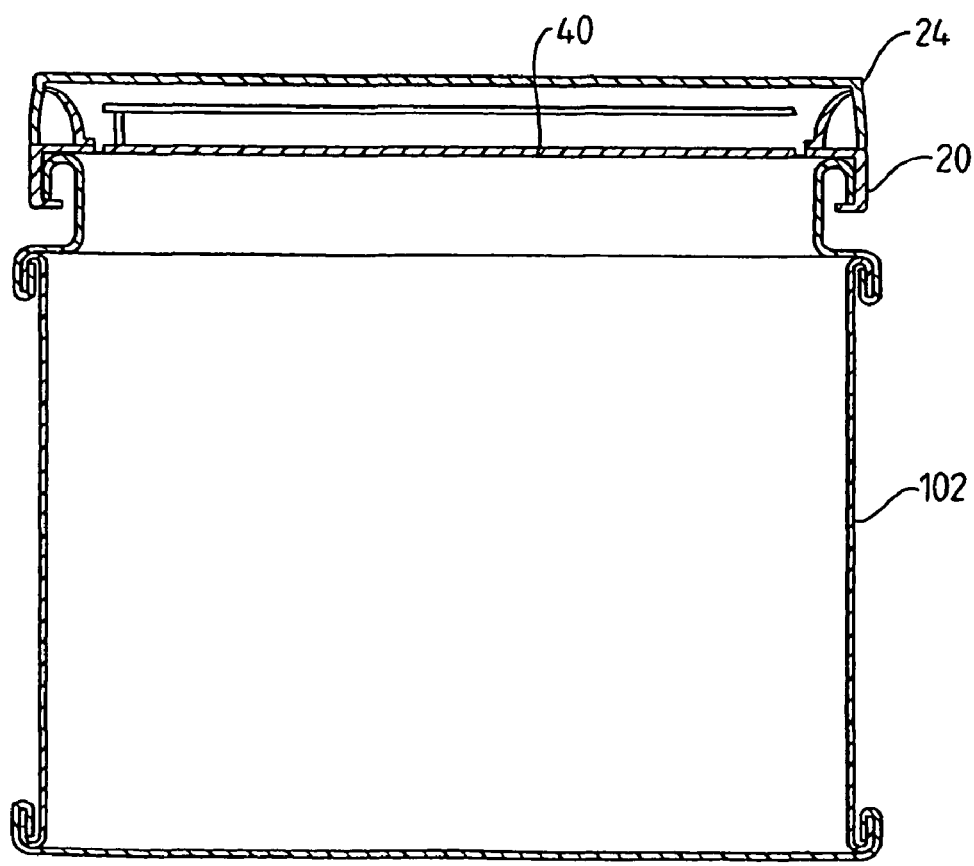
FIG. 7 shows a section through the end plate of FIG. 6 after assembly with a spout and can.

The embodiments described with reference to FIGS. 1-4 are a PET bottle. However, it will be appreciated that the invention is not limited to bottles of this material but has particular additional advantages when used with PET and PVC bottles where it is difficult to form strong welds. The embodiment in FIG. 5 illustrates the use of the closure technology of the invention with an alternative container. The embodiment of FIGS. 6 and 7 shows the application of the process to a can.

A preform 2 for a PET bottle is injection moulded from PET in a conventional manner. The preform may be made of a modified or blended PET plastics material that provides an improved barrier to gas penetration. For example PET may be blended with PEN. The preform 2 can also be made from PET granules with which a masterbatch has been mixed before melting the granules so that the normal PET is mixed with a barrier masterbatch. The preform 2 could also be coinjected such that it has several layers.

The preform 2 has a body portion 4, which comprises the material which will be stretch blow moulded to form the bottle body, and a neck 6. The neck portion 6 and body portion 4 are separated by a transport ring 8. This ring 8 is created at the junction of two mould parts used to mould the preform. The neck portion 6 has a reduced height relative to a conventional preform with screw threads as the neck portion only needs to be tall enough to support a skirt 20 of a spout 22.

Figure 1B:
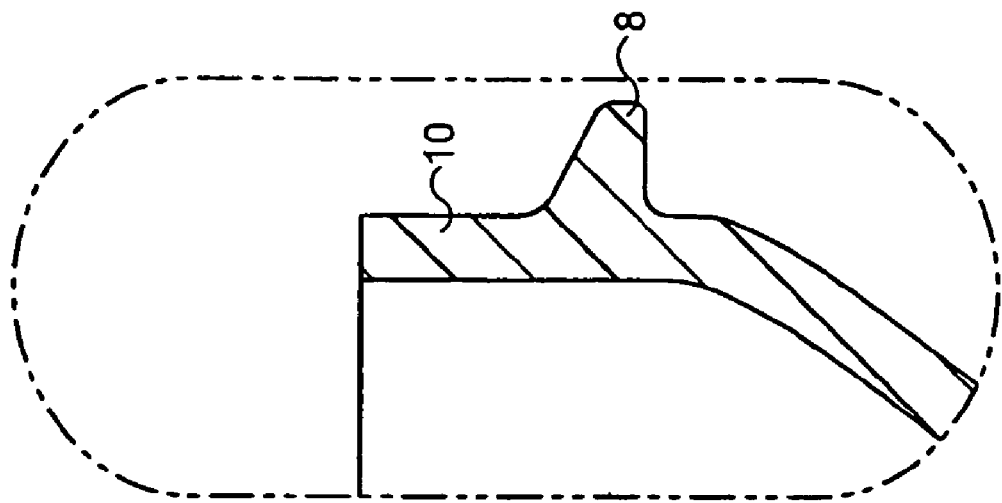
FIG. 1B shows a detail of a top portion of the preform of FIG. 1A.
Figure 1A:
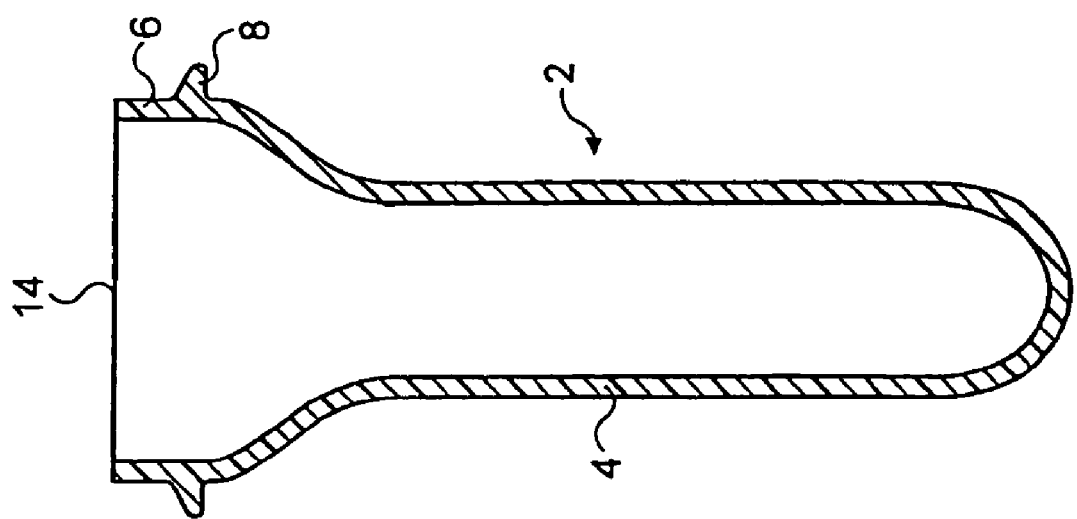
FIG. 1A shows a cross section through a first PET preform suitable for use in the present invention.

The neck portion 6 is preferably a simple cylindrical side wall 10 devoid of moulded features for maximum economy and minimum weight as shown in FIGS. 1A and B.

Figure 1D:
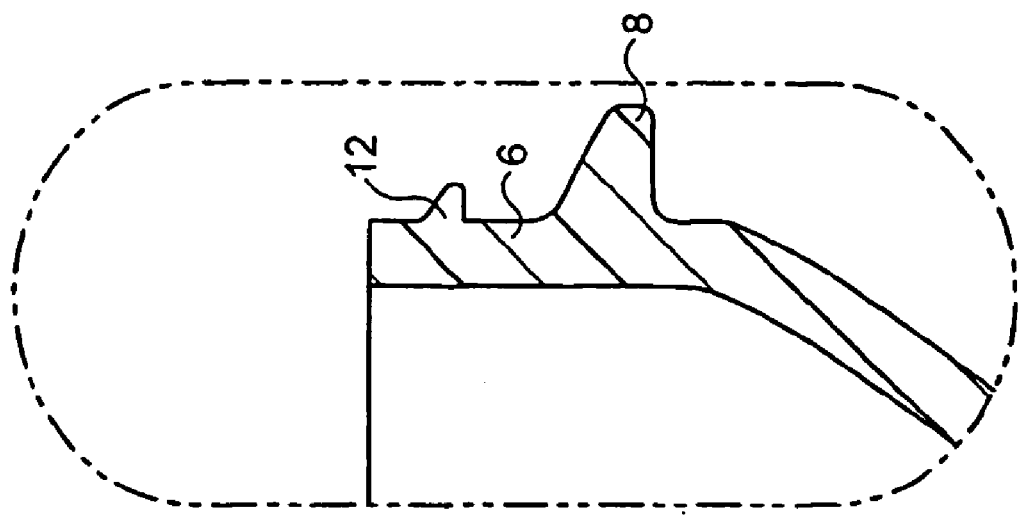
FIG. 1D shows a detail of a top portion of the preform of FIG. 1C.
Figure 1C:
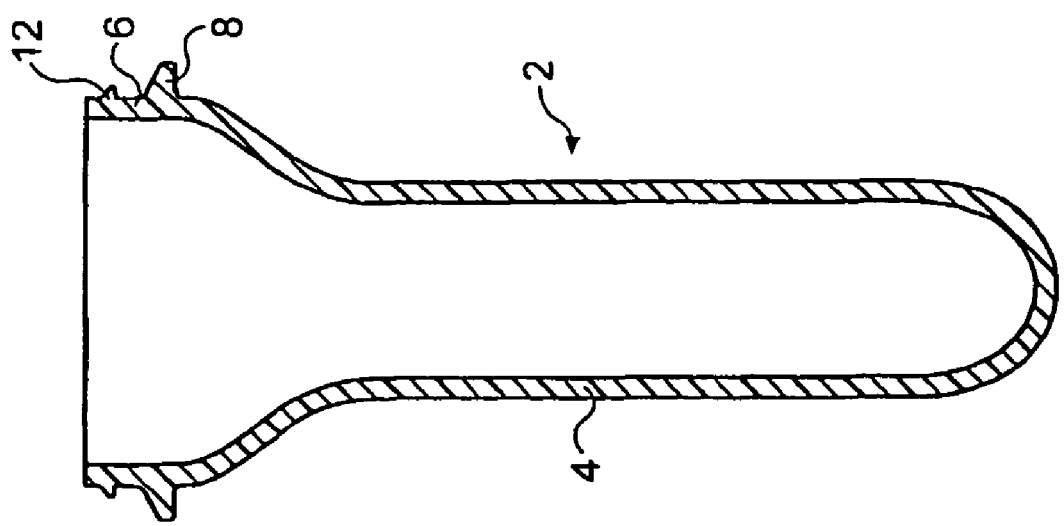
FIG. 1C shows a cross section through a second PET preform suitable for use in the present invention.

However a rib 12 may be formed at or adjacent an open mouth 14 of the neck 6 as shown in FIG. 1D to aid in positioning of the spout 22 or to facilitate the removal of the blown PET bottle from the injection stretch blow mould.

The spout 22 is of the same construction as that described in WO 99/61337 (Spreckelsen McGeough Ltd) to which reference may be made. In that specification the assembly of spout 22 and cap 24 is referred to as a "neck and cap assembly". The spout 22 has a skirt 20 and a pourer 26 to which a cap 24 is snap fitted. The cap 24 could also be a screw on cap. The skirt 20 merges with the pourer 26 at a horizontal flange 30. A foil 40 is welded across an opening in the spout and secured to an underside of the flange 30. A ring pull structure 32 is provided inside the pourer 22 to allow the foil 40 to be removed.

In the prior art assembly for use with extrusion blow moulding, the foil 40 is entirely flat but in accordance with a first embodiment of the present invention the foil 40 has a portion 42 that depends downwardly around the inside of the skirt 20 so that it can be welded to an outer surface of the side wall 10. Instead of relying on a weld in a plane of the opening and horizontal flange 30 but rather one between a side wall 10 of the neck portion 6 and the depending portion 42 of the foil 40, a sheer force is applied to the weld when the ring pull structure 32 is used to open the closure or when any attempt is made to lever the assembly from the bottle.

In an alternative embodiment as shown in FIG. 3 a flat foil 40 is provided across the whole of the interior of the spout so that when the spout 22 is applied to the bottle body the foil is pushed down adjacent an inner part of the side wall 10. This can be made to happen by the application during an induction heating cycle of downward fitting force over the pourer 26 which is forced into the neck 6 of the bottle as the material of the flange 30 is deformed. An inwardly facing ledge 46 is formed around the interior of the side wall 10 in order to provide a seat for the foil covered flange 30 in its fully inserted position as shown in FIG. 3. The lower surface of the foil 40, 44 will also seal to the upper horizontal surface 48 of this ledge 46. In this case an annular portion 44 of the foil 40 which previously lay underneath the outermost part of the flange 30 before the deformation now extends upwards from a central portion of the foil and is welded to the interior of the side wall 10. In its final position therefore the flat foil 40 has adopted a cup shape terminating on or adjacent the horizontal upper surface of the neck portion 6. As in the previously described embodiment the weld against the side wall 10 is also placed in sheer rather than tension when the foil 40 is opened by the ring pull structure 32 or any attempt is made to prise the assembly off by placing a lever under the skirt 20.

Instead of being deformed into the structure shown in FIG. 3 a spout may be moulded in that shape and be designed to be plugged into the neck. In this embodiment the foil portion 44 extends upwardly around the outer side of the spout.

A side wall 10 weld is less sensitive to warping of the neck 6 that may occur during the hot filling process or the application of heat to produce the weld. This may create significant deformations of the top surface of the preform that would make a weld against that surface unachievable while a preform side wall weld is less affected.

Figure 4:
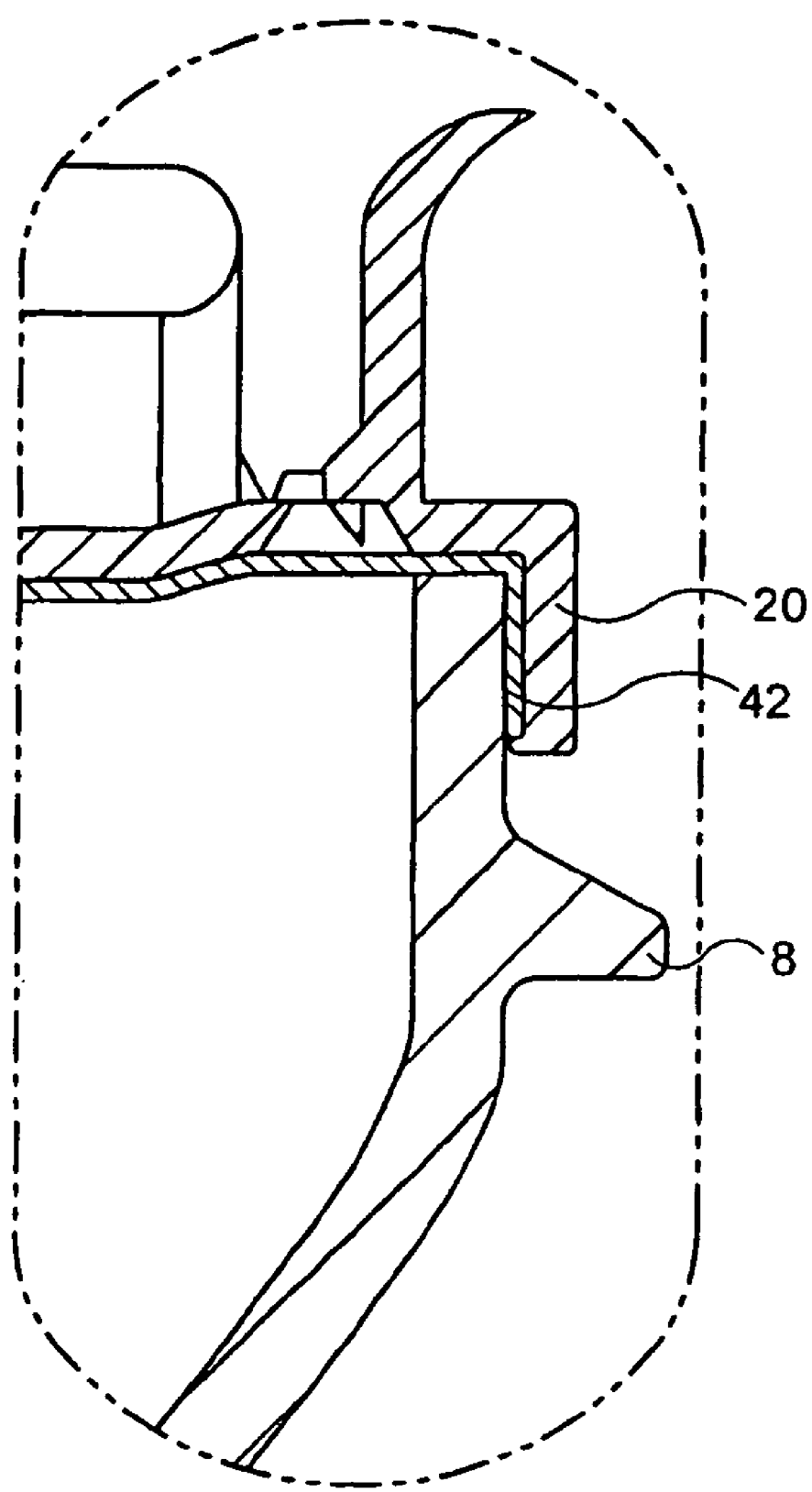
FIG. 4 shows a detail from a cross section of a neck and cap assembly illustrating the use of an oversized foil in a hot filling process using the closure technology of the present invention.

FIG. 4 illustrates an oversized foil 40 but with the weld to the neck 6 being adjacent the outer face of the side wall 10. This embodiment is specifically adapted for hot filling. Here the foil 40 is puffed up into the interior of the spout during fitting and is allowed to flex inwardly (as shown in the drawing) during cooling after the weld has been formed to partially relieve the vacuum created inside the bottle body. This allows this closure technology to be used with bottle bodies that need less reinforcing pressure panels to withstand the vacuum created after filling.

This type of closure technology will permit hot fill applications in excess of 75° C. without the use of preform neck crystallization as some degree of neck deformation can be accommodated by the side wall welding.

In the embodiments described a spout 22 with a snap on cap 24 has been shown. If the bottle is to be used with a carbonated product the pourer 26 would be provided with screw threads to engage with a screw-on over cap for resealing purposes.

Where the bottle body has been coated with an internal or external barrier coating on the inside or outside of the bottle body, the weld with the side wall 10 may be made to the plastics material of the uncoated face or, where the coating is of a weldable material to the coated face. Alternatively the coating may be terminated short of the top of the side wall 10.

In the container shown in FIG. 5 equivalent parts are identified by means of the same reference numerals distinguished by a prime symbol. The container shows the use of a spout 22 with a composite container 80 which is a cylinder of laminated paperboard with a base. In this design the side wall 82 of the container is effectively the side wall of the neck 6 in the terminology used in this specification and claims.

The paperboard laminate (which may include other layers such as aluminium foil or EVOR) has an external and/or internal coating 84 of a plastics coating such as polypropylene or polyethylene or PET, which welds to a similar coating on the foil portion 42 against the side wall 8 and also with the horizontal upper surface 86 of the side wall 82.

It will be appreciated that similar designs to that shown in FIG. 5 can be used with plastics coated steel cans.

Both composite and metal containers could also be formed with a plastics or plastics coated top or end plate that defines a separate neck portion to which a spout 22 could be fitted in any of the ways previously described. In this variation the end plate can be assembled together with its spout independently of the filling step and seamed as a complete unit onto the can body.

FIG. 6 and FIG. 7 illustrate an end plate suitable for this purpose. The plastics coated end plate 90 has an outer edge 92 designed to be sealed or seamed to a can and a central opening 94 that is defined by a side wall 96. The edges 98 of side wall 96 are turned outwardly and downwardly around the opening in order to engage with a skirt 20 of the spout 22. Where only the lower surface of the end plate 90 is plastics coated, this configuration exposes the plastics coating 100 to the foil 40. The fitting of the spout to the end plate 90 is then carried out as previously described. Since the seaming of end plates to cans is normally carried out very rapidly it is preferable for the spouts to be pre-assembled to the end plates before the complete assembly is seamed at its edge 92 to a side wall 102 of the can.

The invention claimed is:

1. A process for assembling a plastic spout that defines a spout opening to a neck portion defined by a side wall with a surface that extends substantially perpendicular to a plane defined by a neck opening in the neck portion, wherein said spout comprises a skirt for extending around the outside surface of the side wall of the neck portion, wherein the skirt, when operatively positioned about the outside surface of the neck portion, has a skirt length that extends from the plane defined by the neck opening to a skirt edge that is adjacent to the neck portion and separated from the plane defined by the neck opening by a distance that is greater than the thickness of the skirt, wherein the side wall being made of or coated with a first plastic material, wherein the spout contains a foil that closes the spout opening in the spout, the foil having a first exposed face coated with a second plastic material compatible with the first plastic material and a second face that is coated with a third plastic material, the process comprising the steps of:

placing the spout with the foil that closes the spout opening of the spout on the neck portion that is defined by the side wall; and welding a portion of the exposed first face of the foil that is coated with the second plastic material to the first plastic material associated with the surface of the side wall that is substantially perpendicular to the plane defined by the neck opening in the neck, wherein the resulting weld extends for a weld length that is a substantial portion of the skirt length and is subjected to a shear force during opening of the foil.

2. A process as claimed in claim 1, wherein the portion of the foil is welded to an inner surface of the side wall of the neck portion.

3. A process as claimed in claim 1, wherein the portion of the foil is welded to an upper surface of an inwardly facing ledge on an inner surface of the side wall of the neck portion.

4. A process as claimed in claim 1, wherein the surface of the side wall is an outer surface of the side wall of the neck portion.

5. A process as claimed in claim 1, wherein a portion of the foil is also welded to a top face of the side wall that surrounds the aligned openings.

6. A process as claimed in any one of claims 1, 2, 3, 4 or 5, wherein the first plastic material is polypropylene, polyethylene, PET or PVC.

7. A process as claimed in any one of claims 1, 2, 3, 4 or 5 wherein the neck portion is provided on an end plate and the spout is assembled to the end plate and subsequently the end plate is assembly sealed is to a filled container.

8. A process as claimed in claim 1 wherein the surface of the sidewall is the outermost surface of the sidewall between the plane defined by the neck opening and a transport ring.

9. A process as claimed in claim 1 wherein the portion of the foil that is welded to the surface of the side wall of the neck portion and extends for the weld length also extends from the surface of the side wall to an inner surface of the skirt.

10. A process as claimed in claim 1 wherein the surface is substantially equidistant from an opposing surface over a substantial portion of the length of the neck portion.

* * * * *

UNITED STATES PATENT AND TRADEMARK OFFICE
CERTIFICATE OF CORRECTION

PATENT NO. : 7,578,040 B2 Page 1 of 1
APPLICATION NO. : 10/898459
DATED : August 25, 2009
INVENTOR(S) : von Spreckelsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 219 days.

Signed and Sealed this

Seventh Day of September, 2010

David J. Kappos
*Director of the United States Patent and Trademark Office*